(12) United States Patent
Shankaramurthy et al.

(10) Patent No.: US 9,384,412 B2
(45) Date of Patent: Jul. 5, 2016

(54) METHOD AND APPARATUS, COMPUTER-READABLE MEDIUM FOR CONTENT AWARE MULTIMEDIA RESIZING

(71) Applicant: Samsung Electronics Co., Ltd., Gyeonggi-do (KR)

(72) Inventors: Nandan Hosaagrahara Shankaramurthy, Karnataka (IN); Sanjay Narasimha Murthy, Karnataka (IN); Pavan Sudheendra, Bangalore (IN); Rajaram Hanumantacharya Naganur, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/473,989

(22) Filed: Aug. 29, 2014

(65) Prior Publication Data
US 2015/0063705 A1    Mar. 5, 2015

(30) Foreign Application Priority Data

Aug. 29, 2013    (IN) .......................... 3869/CHE/2013

(51) Int. Cl.
| | |
|---|---|
| *G06K 9/46* | (2006.01) |
| *G06K 9/66* | (2006.01) |
| *G06K 9/00* | (2006.01) |
| *G06T 3/00* | (2006.01) |

(52) U.S. Cl.
CPC .............. *G06K 9/46* (2013.01); *G06K 9/00456* (2013.01); *G06T 3/0012* (2013.01)

(58) Field of Classification Search
None
See application file for complete search history.

(56) References Cited

U.S. PATENT DOCUMENTS

| | | | |
|---|---|---|---|
| 8,218,895 B1 * | 7/2012 | Gleicher | ............... G06T 3/0025 345/427 |
| 8,218,900 B1 | 7/2012 | Avidan et al. | |
| 2008/0198178 A1 * | 8/2008 | Julin | ......................... G06T 3/40 345/661 |
| 2009/0245600 A1 * | 10/2009 | Hoffman | ............ A61B 1/00039 382/128 |
| 2011/0211771 A1 | 9/2011 | Rubenstein et al. | |
| 2011/0267499 A1 * | 11/2011 | Wan | ....................... H04N 5/232 348/231.99 |

* cited by examiner

*Primary Examiner* — Feng Niu

(57) ABSTRACT

A method for content aware multimedia resizing includes selecting at least one Region Of Interest (ROI) in an input multimedia, resizing the at least one ROI, and generating an output multimedia with the resized at least one ROI. An electronic device for content aware multimedia resizing includes a processor configured to select ROI in an input multimedia, resize the at least one ROI, and generate an output multimedia with the resized at least one ROI. A computer-readable medium storing a program for content aware multimedia resizing, the program which when executed by a processor causes the processor to perform operations including selecting ROI in an input multimedia, resizing the at least one ROI, and generating an output multimedia with the resized at least one ROI.

25 Claims, 11 Drawing Sheets

METHOD AND APPARATUS, COMPUTER-READABLE MEDIUM FOR CONTENT AWARE MULTIMEDIA RESIZING

CROSS-REFERENCE TO RELATED APPLICATIONS AND CLAIM OF PRIORITIES

The present application is related to and claims priority under 35 U.S.C. §119(a) to Indian Patent Application No. Indian Patent Application No. 3869/CHE/2013 which was filed in the Indian Patent Office on Aug. 29, 2013 and Korean Patent Application No. 10-2014-0005447 which was filed in the Korean Intellectual Property Office on Jan. 16, 2014, the entire disclosures of the disclosures are incorporated herein by reference.

TECHNICAL FIELD

The present disclosure relates generally to a field of multimedia processing, and more particularly, to a method for content aware multimedia resizing.

BACKGROUND

The diversity and versatility of display devices imposes new demands on designers of digital multimedia. For example, designers must create different alternatives for web content and must design different layouts for different display devices. Also, Hyper Text Markup Language (HTML) and other standards can support dynamic changes of page layout. Typically, sizes of images or videos which are one of the core elements of digital multimedia maintain a rigid state, and cannot be modified so as to automatically fit different layouts in view of an aspect ratio of the image or video. In other cases, the size or aspect ratio of an image or video needs to be changed so as to fit different display devices, such as computers, cell phones or Personal Digital Assistants (PDAs). Also, the video may need to be shown with different runtimes for different purposes (e.g., video summarization and video editing). Further, video and image content in web pages, which are a part of a web layout, needs to be resized based on resolutions of the display devices.

Conventional technologies for image resizing typically include scaling and cropping, however, do not consider the content of an image to be resized. Such technologies are oblivious to the image content, and typically can only be applied uniformly. Also, such methods may distort the image content which may be important to a viewer. More effective resizing can only be achieved by considering the image content as a whole, in conjunction with image dimensions.

An existing method resizes an image by using seam carving. The method operates on "seams" that run from one side of the image across to the other. Removing all pixels in a seam reduces the image by one row or one column of pixels. In contrast, adding seams to the image can enlarge the image by one row or one column of pixels. When multiple seams are removed from identical areas within the image, distortions are likely to occur and be visible in the resized image. Because these and other existing technologies are computationally expensive, they cannot provide real-time performance. From all these points of view, the existing technologies are not adequate to meet the demands created by the diversity and versatility of display devices.

SUMMARY

To address the above-discussed deficiencies, it is a primary object to provide a method for content aware multimedia resizing.

In accordance with an aspect of the present disclosure, a method for content aware multimedia resizing is provided. The method includes uniformly resizing selected at least one Region Of Interest (ROI) in input multimedia by maintaining an aspect ratio of the selected at least one ROI in output multimedia to be the same as an aspect ratio of the input multimedia. Further, the method includes nonlinearly resizing at least one non-ROI in the input multimedia, and generating the resized at least one non-ROI.

In accordance with another aspect of the present disclosure, a computer-readable medium storing a program for content aware multimedia resizing is provided. The computer-readable medium includes an integrated circuit. Further, the integrated circuit includes at least one processor and at least one memory having a computer program code within the integrated circuit. Further, the at least one memory and the computer program code together with the at least one processor cause the computer-readable medium to unifottuly resize selected at least one Region Of Interest (ROI) in input multimedia by maintaining an aspect ratio of the selected at least one ROI in output multimedia to be the same as an aspect ratio of the input multimedia, by a Content Aware Image Resizing (CAIR) module. Further, the computer-readable medium is configured to nonlinearly resize at least one non-ROI in the input multimedia and generate the resized at least one non-ROI, by the CAIR module.

In accordance with an aspect of the present disclosure, a method for content aware multimedia resizing is provided. The includes selecting at least one Region Of Interest (ROI) in an input multimedia, resizing the at least one ROI, and generating an output multimedia with the resized at least one ROI.

In some embodiments, the method includes nonlinearly resizing at least one non-ROI in the input multimedia.

In some embodiments, resizing the at lease one ROI comprises maintaining an aspect ratio of the at least one ROI in the output multimedia to be the same as an aspect ratio of the input multimedia.

In some embodiments, the input multimedia comprises one of an image and a video.

In some embodiments, the method includes, before resizing of the at least one ROI, acquiring dimensions of the at least one ROI in the input multimedia, and sorting the at least one ROI with respect to the dimension.

In some embodiments, the method includes determining at least one non-overlapping ROI among the sorted ROI.

In some embodiments, the method includes, before resizing of the at least one non-ROI, identifying the at least one non-ROI, and obtaining dimensions of the at least one non-ROI.

In some embodiments, resizing the selected at least one ROI includes calculating an resized dimension of the at least one ROI based on dimensions of the output multimedia; and resizing the at least one ROI according to the calculated resized dimension.

In some embodiments, the method includes calculating an resized dimension of the at least one non-ROI based on at least one of the dimension of the output multimedia, and the calculated resized dimension of the at least one ROI, and dividing the at least one non-ROI into multiple segments, wherein each of the multiple segments comprises one or more pixels.

In some embodiments, the method includes nonlinearly resizing the segments by applying a resizing function, wherein the resizing function determines a resizing factor of each of the segments.

In some embodiments, resizing at least one ROI includes at lesat one of increasing or decreasing at least one ROI in a horizontal dimension, and increasing or decreasing at least one ROI in a vertical dimension.

In some embodiments, the resizing factor decreases non-linearly towards the at least one ROI from the at least one non-ROI, when the resizing corresponds to the horizontal up resizing or the vertical up resizing, and wherein the resizing factor increases nonlinearly towards the at least one ROI from the at least one non-ROI, when the resizing corresponds to the horizontal down resizing or the vertical down resizing.

In some embodiments, the resizing factor increases non-linearly towards a midpoint between the at least one ROI and a successive ROI in the input multimedia, and decreases towards the successive ROI, when the at least one non-ROI exists in between the at least one ROI and the successive ROI in the input multimedia.

In some embodiments, the method includes generating the resizing function.

In some embodiments, the method includes generating the output multimedia by arranging the at least one resized ROI and the at least one resized non-ROI in order of occurrence of coordinates of the at least one resized ROI and the at least one resized non-ROI in the input multimedia.

In accordance with an aspect of the present disclosure, a computer-readable medium storing a program for content aware multimedia resizing is provided. The program which when executed by a processor causes the processor to perform operations including selecting at least one Region Of Interest (ROI) in an input multimedia, resizing the at least one Region Of Interest (ROI), and generating an output multimedia with the resized at least one ROI.

In accordance with an aspect of the present disclosure, an electronic device for content aware multimedia resizing is provided. The electronic device includes a processor configured to select at least one Region Of Interest (ROI) in an input multimedia, resize the at least one ROI, and generate an output multimedia with the resized at least one ROI.

By applying the method for content aware multimedia resizing, it is possible to provide the user with control over ROIs and resizing. Also, better viewing can be provided to the user by reducing the distortion of a resized image. Further, a resizing process to which the method for content aware multimedia resizing is applied is advantageous in that it is inexpensive.

These and other aspects of the embodiments of the present disclosure will be better appreciated and understood when considered in conjunction with the following description and the accompanying drawings. However, it should be understood that the following description, while indicating exemplary embodiments and numerous specific details thereof, is given by way of example and not of limitation. Many changes and modifications may be made within the scope of the embodiments of the present disclosure without departing from the spirit of the present disclosure, and the embodiments thereof include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
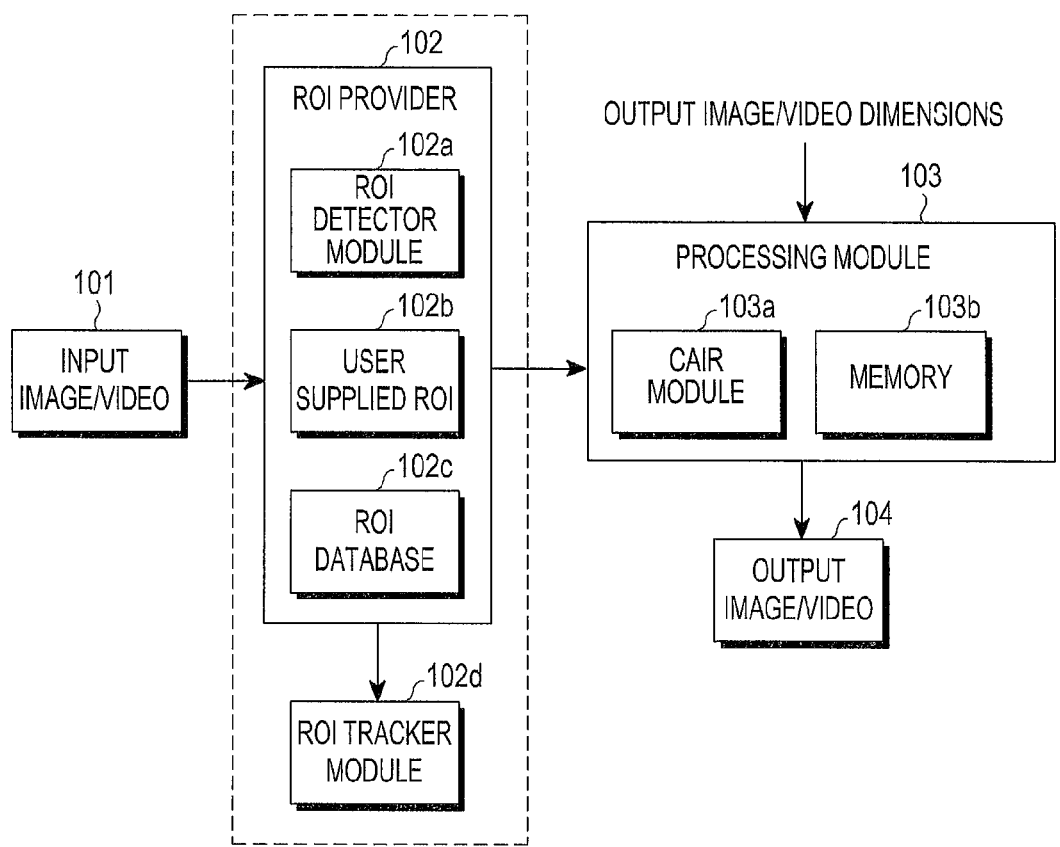
FIG. 1 illustrates a block diagram illustrating a configuration of a device for content aware image resizing, according to embodiments of the present disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. Embodiments of the present disclosure and the various features and advantageous details thereof are described with reference to the non-limiting embodiments that are illustrated in the accompanying drawings and are described in detail in the following description. Descriptions of well-known components and processing techniques are omitted so as not to unnecessarily obscure the embodiments thereof. The examples used herein are intended merely to facilitate understanding of ways in which the embodiments thereof may be practiced and to further enable those skilled in the art to practice the embodiments thereof. Accordingly, the examples should not be construed as limiting the scope of the embodiments thereof.

The embodiments of the present disclosure achieve a method and system for resizing multimedia by considering multimedia content as a whole, in conjunction with dimensions. Multimedia disclosed in this specification is at least one of videos, images and text. The embodiments of the present disclosure are described in view of an image. However, it will be obvious to those skilled in the art that the embodiments of the present disclosure may be extended to multimedia in any other form.

An input image to be resized is divided into at least one Region Of Interest (ROI) and at least one non-ROI. ROIs are regions of the image regarded as being more important than other regions in the image. By way of example and not of limitation, ROIs may be diversified, for example, flowers, fruits, faces, monuments, and the like. At least one ROI is resized uniformly by maintaining an aspect ratio of at least one ROI in an output image to be the same as that of the input image, and at least one non-ROI is resized nonlinearly by applying a resizing function.

Also, the method is capable of selecting at least one ROI and at least one non-ROI for resizing from the input image in order to meet target dimensions of the output image. Further, some of the selected ROIs and non-ROIs may or may not be considered as being resized according to the dimensions of the input image and target dimensions of the output image. At least one non-ROI spaced apart from an ROI in the input image is resized at a higher rate than at least one non-ROI near the ROI in the input image, thereby preserving the ROI and regions in the input image. Lastly, the resized at least one ROI and non-ROI are arranged in order of occurrence of the resized at least one ROI and non-ROI with respect to coordinates of the input image, thereby generating the output image.

Throughout the description, the terms "dimension" and "size" are used interchangeably.

Referring now to the drawings, more particularly, to FIGS. 1 to 12, in which similar reference numerals denote corresponding features consistently throughout the drawings, exemplary embodiments of the present disclosure will be described.

FIG. 1 illustrates a block diagram illustrating a configuration of a device for content aware image resizing, according to embodiments of the present disclosure. The device may include an ROI provider 102 and a processing module 103. The processing module 103 may include a Content Aware Image Resizing (CAIR) module 103a, and at least one memory 103b. When an image to be resized is received as input as denoted by reference numeral 101, the input image 101 is delivered to the ROI provider 102 that provides at least one ROI in the input image 101 together with dimensions to the processing module 103.

The processing module 103 identifies a non-ROI in the input image 101, receives target dimensions of an output image 104 including a height and a width, and processes the input image 101 so as to be resized, thereby generating the resized output image 104.

The ROI provider 102 may include an ROI detector module 102a, an ROI database 102c, a user supplied ROI 102b, and an ROI tracker module 102d. Also, the ROI provider 102 acquires at least one ROI in the input image 101, according to at least one of the ROI detector module 102a, the ROI database 102c, the user supplied ROI 102b and the ROI tracker module 102d. Further, according to embodiments of the present disclosure, a user is provided with an option to select at least one ROI in the input image 101, thereby providing the user with control over the at least one ROI. By way of example and not of limitation, the ROI detector 102a may detect at least one ROI in the input image 101 by using at least one of existing methods, such as a face detection algorithm and an object detection algorithm. In addition, the ROI detector 102a may detect at least one ROI in the input image 101 by using various detection methods as well as the above-described detection methods. Further, the ROI detector 102a may detect multiple different ROIs in the image by using different detection methods. Dimensions of the image, such as a width and a height, may be represented on the 'x' axis and the 'y' axis of a two-dimensional plane, respectively. Moreover, the dimensions of the image, such as a width and a height, may be represented as values respectively matched to the 'x' axis and the 'y' axis of a two-dimensional plane.

When receiving target dimensions including a height and a width of the output image 104 and the input image 101 having at least one ROI, the processing module 103 processes the input image 101 so as to be resized, by performing at least one of horizontal resizing and vertical resizing. For example, when one target dimension (i.e., the height of the output image 104) is greater or less than the height of the input image 101, the processing module 103 performs the resizing (i.e., vertical resizing) of the input image 101 on the 'y' axis. Thereafter, when the other target dimension (i.e. the width of the output image 104) is greater or less than the width of the input image 101, the processing module 103 performs the resizing (i.e., horizontal resizing) of the input image 101 on the 'x' axis. Alternatively, the processing module 103 may perform horizontal resizing on the input image 101 and then may perform vertical resizing on the input image 101. Alternatively, the processing module 103 may be configured to simultaneously perform both horizontal resizing and vertical resizing on the input image 101 so as to meet the target dimensions of the output image 104.

Figure 2:
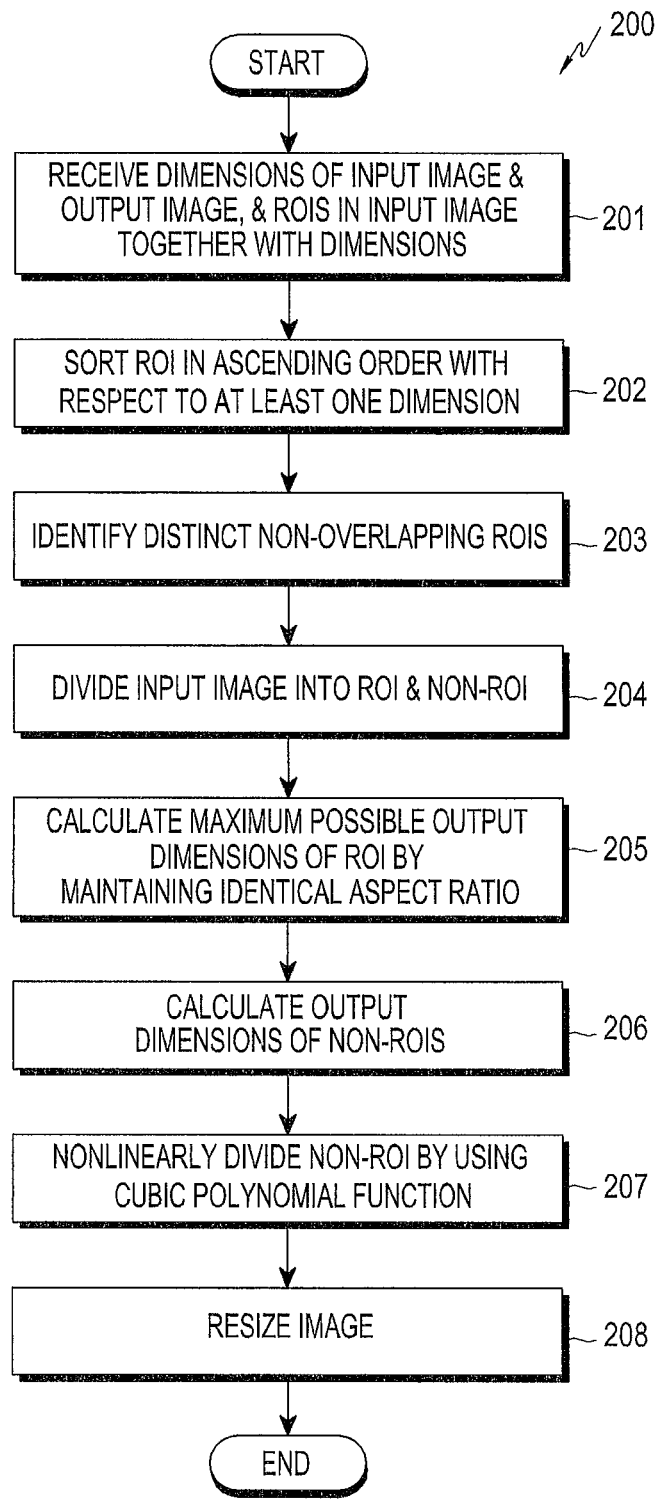
FIG. 2 illustrates a flowchart illustrating a method for content aware image resizing, according to embodiments of the present disclosure.

FIG. 2 illustrates a flowchart illustrating a method for content aware image resizing, according to embodiments of the present disclosure. Referring FIG. 2, in step 201, the processing module 103 receives the input image 101, dimensions including a height and a width of the input image 101, target dimensions of the output image 104, and at least one detected ROI in the input image 101 provided by the ROI provider 102.

In response to the received input, in step 202, the CAIR module 103a of the processing module 103 sorts at least one ROI in ascending order with respect to 'x' coordinates (width) and 'y' coordinates (height), namely, in order of occurrence with respect to coordinates in the input image 101. For example, when the CAIR module 103a is performing vertical resizing (i.e., resizing the input image 101 in the 'y' axis direction), the received at least one ROI is sorted in ascending order with respect to height. Similarly, when the CAIR module 103a is performing horizontal resizing (i.e., resizing the input image 101 in the 'x' axis direction), the received at least one ROI is sorted in ascending order with respect to width.

In step 203, the CAIR module 103*a* identifies at least one distinct non-overlapping ROI within the sorted ROI by combining overlapping ROIs. The CAIR module 103*a* compares one ROI with a successive ROI within the sorted ROIs. When a result of the comparison shows that the one ROI and the successive ROI are partially overlapping, the CAIR module 103*a* constructs at least one new ROI. Also, when the at least one ROI completely belongs to the successive ROI, the CAIR module 103*a* deletes the at least one ROI.

When acquiring the at least one distinct non-overlapping ROI, in step 204, the CAIR module 103*a* identifies at least one non-ROI together with dimensions (i.e., dimensions of an identified non-ROI as described below), and divides the sorted ROIs into at least one detected ROI and at least one identified non-ROI. Also, the CAR module 103*a* generates an input list including dimensions of at least one detected ROI, and dimensions of at least one identified non-ROI in order of occurrence of the at least one detected ROI and the at least one identified non-ROI with respect to coordinates of the input image 101.

In step 205, the CAIR module 103*a* calculates maximum output dimensions of the at least one detected ROI by maintaining aspect ratios of ROIs in the output image 104 to be the same as those of the input image 101. The output dimensions including a maximum height and a maximum width of the at least one ROI are calculated by using Equations (1) and (2) below.

$$\text{output } ROI \text{ width} = \frac{\text{output image width}}{\text{input image width}} \times \text{input } ROI \text{ width} \quad (1)$$

$$\text{output } ROI \text{ height} = \frac{\text{output image height}}{\text{input image height}} \times \text{input } ROI \text{ height} \quad (2)$$

When a ratio of an input image width to an input image height is greater than a ratio of an output image width to an output image height, the CAIR module 103*a* calculates an output ROI width by using Equation (1). Accordingly, an output ROI height is calculated for a corresponding input ROI by using the output ROI width calculated by maintaining aspect ratios of an output ROI to be the same as those of an input ROI. Similarly, when a ratio of an input image width to an input image height is less than a ratio of an output image width to an output image height, the CAIR module 103*a* calculates an output ROI height by using Equation (2). Accordingly, an output ROI width is calculated for a corresponding input ROI by using the output ROI height calculated by maintaining aspect ratios of an output ROI to be the same as those of an input ROI.

In step 206, the CAIR module 103*a* calculates at least one dimension of the at least one identified non-ROI based on target dimensions of the output image 104 and the output dimensions of the at least one ROI, which have been calculated in step 205. A height and a width of the at least one non-ROI are calculated by using Equations (3) and (4) below.

$$\text{output non-} ROI \text{ width} = \quad (3)$$
$$\left(\frac{\text{output image width} - \text{total output } ROI \text{ width}}{\text{total input non-} ROI \text{ width}}\right) \times$$
$$\text{input non-} ROI \text{ width}$$

$$\text{output non-} ROI \text{ height} = \quad (4)$$
$$\left(\frac{\text{output image height} - \text{total output } ROI \text{ height}}{\text{total input non-} ROI \text{ height}}\right) \times$$
$$\text{input non-} ROI \text{ height}$$

Also, the CAIR module 103*a* generates an output list including the calculated dimensions of the at least one detected ROI, and the calculated dimensions of the at least one identified non-ROI, in order of their occurrence in the input list.

When the output dimensions of the at least one ROI and those of the at least one non-ROI have been calculated, in step 207, the CAIR module 103*a* nonlinearly resizes the at least one non-ROI by applying a resizing function as described below. The CAIR module 103*a* divides each non-ROI into multiple segments including one or more pixels, and nonlinearly resizes each of the segments based on at least one resizing factor, thereby generating at least one resized non-ROI.

The resizing factors are matched to the segments, respectively, and decrease nonlinearly towards the ROI from the non-ROI. This decrease in resizing factor is calculated by using a curve having two different slopes at two different end points. A nonlinear function satisfying these conditions may be selected as the resizing function. Examples of the nonlinear function may include a cubic polynomial function, a quadratic function, an exponential function, and a logarithmic function. As an example, consideration is given to a cubic polynomial, such as a nonlinear function expressed by Equation (5) below.

$$f(x) = ax^3 + bx^2 + cx + d \quad (5)$$

Also, the method calculates coefficients a, b, c and d of the cubic polynomial by generating a curve for each non-ROI. Together with the input dimensions and output dimensions of each non-ROI, the CAIR module 103*a* provides end points of the curve and slopes at the end points. The CAIR module 103*a* calculates slopes at the end points of the curve based on a calculated size of at least one non-ROI, and a calculated size of at least one ROI near the at least one non-ROI. A slope of the curve at one end point which is far away from the ROI is expressed by Equation (6) below.

$$\text{slope} = \left(\frac{\text{output non-} ROI \text{ width/output non-} ROI \text{ height}}{\text{input non-} ROI \text{ width/input non-} ROI \text{ height}}\right) \times 2 - \quad (6)$$
$$\left(\frac{\text{input } ROI \text{ width/input } ROI \text{ height}}{\text{output } ROI \text{ width/output } ROI \text{ height}}\right)$$

A case is described in which a slope of the curve at the other end point near the ROI is equal to 1 so as to preserve a region near the ROI.

The CAIR module 103*a* uses existing methods to determine the coefficients of the cubic polynomial by using the calculated slopes. When the CAR module 103*a* determines the coefficients, a resizing factor of each segment of each non-ROI is calculated by using the generated cubic polynomial. A resizing factor of pixels in an n-th segment is determined by subtracting f(n) from f(n−1). Each segment of each non-ROI is resized according to the calculated resizing factor, thereby generating a resized non-ROI.

In step 208, the processing module 103 generates the output image 104 including the at least one resized ROI and the at least one resized non-ROI in order of occurrence in the output list. The various steps denoted by reference numeral 200 in FIG. 2 may be performed in a given order, in a different order, or simultaneously. Alternatively, in embodiments, some steps listed in FIG. 2 may be omitted.

Figure 3A:
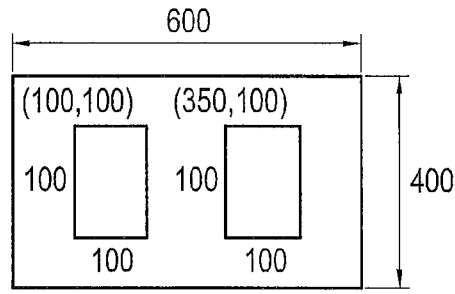
FIGS. 3A to 3D each illustrate an example of a method for content aware image resizing, according to embodiments of the present disclosure.

FIGS. 3A to 3D each illustrate example methods for content aware image resizing, according to embodiments of the present disclosure. FIGS. 3A to 3D provide an example of upsizing dimensions of the input image 101 from 600×400 to 800×400. The ROI provider 102 receives the input image 101 for the use of resizing together with dimensions 600×400 of the input image 101. When receiving the input image 101, the ROI provider 102 detects two ROIs each having dimensions of 100×100 and respectively positioned at coordinates (100, 100) and (350, 100) of the input image 101, as illustrated in FIG. 3A. The detected ROIs together with the dimensions and the input image 101 are delivered to the processing module 103. Also, target dimensions 800×400 of the output image 104 are received by the CAIR module 103a.

Figure 3B:
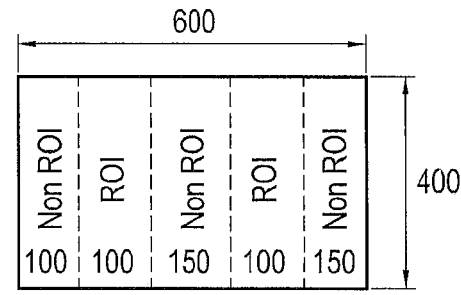

When the target dimensions of the output image 104 have been received, the CAIR module 103a identifies the type of resizing to be performed. In this example, the CAIR module 103a performs horizontal resizing. In the first step, the CAIR module 103a identifies three non-ROIs in the input image 101, which respectively have widths of 100, 150 and 150 pixels. When identifying the three non-ROIs, the CAIR module 103a divides the input image 101 into ROIs and non-ROIs, as illustrated in FIG. 3B.

Figure 3C:
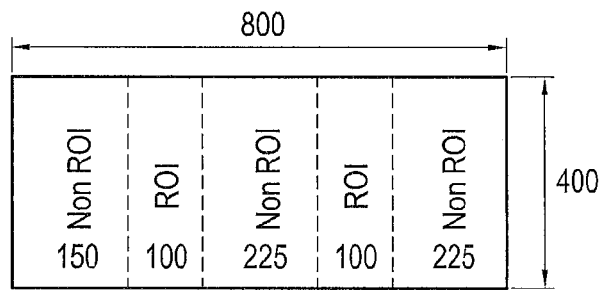

In the next step, the CAIR module 103a calculates a maximum possible output width of an ROI by maintaining aspect ratios of an ROI in the output image 104 to be the same as those of an ROI in the input image 101. In this example, in order to maintain an identical aspect ratio, the ROI may not be further resized. Therefore, a total of 200 pixels of two ROIs are fixed in the output image 104. In order to achieve target dimensions 800×400 of the output image 104, the other 400 pixels are needed to be increased to 600 pixels. Accordingly, total widths of three non-ROIs are needed to be increased from 400 pixels to 600 pixels. In this regard, output widths of the three non-ROIs are calculated as 150, 225 and 225 pixels, respectively, as illustrated in FIG. 3C. As a result, a total width of the ROIs (i.e., 100+100=200) and the non-ROIs (i.e., 150+225+225=600) is increased to 800 pixels.

Figure 3D:
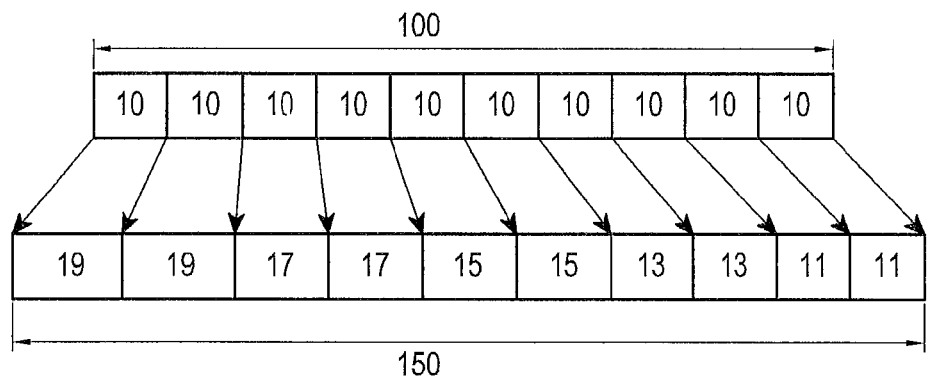

In the further step, the CAIR module 103a nonlinearly divides each non-ROI by using a cubic polynomial. As described above, a resizing factor decreases nonlinearly towards an ROI from a non-ROI. In order to determine this decrease in resizing factor, the CAIR module 103a uses the cubic polynomial. In the present example, a case is described in which a first non-ROI is stretched from 100 pixels to 150 pixels as illustrated in FIG. 3D.

A slope at one end point of the curve spaced apart from an ROI, that the CAIR module 103a has calculated, is found to be 2, and is calculated based on the calculated size of the at least one non-ROI, and the calculated size of the at least one ROI near the non-ROI. By using the calculated slope, the method generates the cubic polynomial function for the first non-ROI, which is expressed by Equation (7) below.

$$f(x) = \left(\frac{1}{200}\right)x^2 + 2x \quad (7)$$

In the further step, the CAIR module 103a divides 100 pixels of the first non-ROI into segments, each of which has one or more pixels. In this example, the 100 pixels are divided into 10 segments each having 10 pixels, as illustrated in FIG. 3D. Lastly, the CAIR module 103a determines a resizing factor of each segment by substituting the number of pixels in each segment into the cubic polynomial function generated in order to determine a resizing factor of a corresponding segment. For example, when x is equal to 10 pixels, a corresponding f(x) (i.e., a resizing factor) for the first segment is 19 pixels. When x is equal to 20 pixels, the corresponding f(x) is 38 pixels. As described above, the resizing factor of pixels in the n-th segment is determined by subtracting f(n) from f(n−1). Accordingly, in this example, the resizing factor of pixels in the second segment is 19 pixels. Similarly, resizing factors are calculated for all segments of all non-ROIs, and the output image 104 is generated according to target dimensions.

Figure 4:
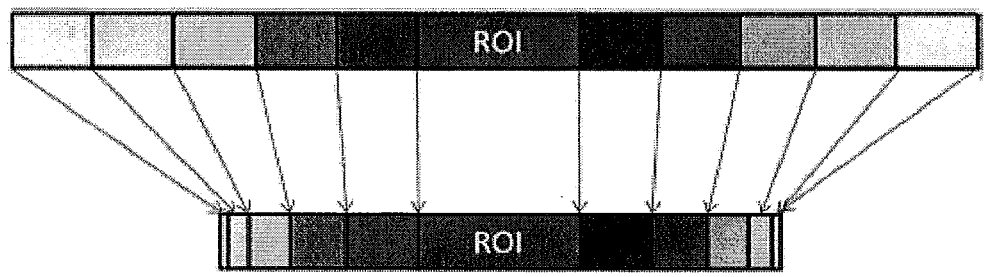
FIG. 4 illustrates an example method for horizontally downsizing pixels of an image, according to embodiments of the present disclosure.

FIG. 4 illustrates an example method for horizontally downsizing pixels of an image, according to an embodiment of the present disclosure. As illustrated in FIG. 4, each block of the image represents one or more pixels. For example, the image having 20 pixels is considered for horizontal resizing in which an ROI has 2 pixels. In order to resize the image from 20 pixels to 12 pixels, the method determines resizing factors such that a resizing factor increases towards an ROI from a non-ROI, as illustrated in FIG. 4. Accordingly, the pixels of the image are reduced by different resizing factors.

Figure 5:
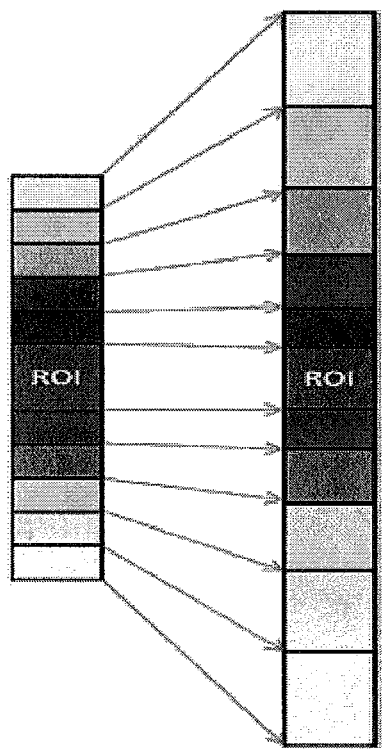
FIG. 5 illustrates an example method for vertically upsizing pixels of an image, according to embodiments of the present disclosure.

FIG. 5 illustrates an example method for vertically upsizing pixels of an image, according to embodiments of the present disclosure. As illustrated in FIG. 5, each block of the image represents one or more pixels. For example, the image having 12 pixels is considered for vertical resizing in which an ROI has 2 pixels. In order to resize the image from 12 pixels to 20 pixels, the method determines resizing factors such that a resizing factor decreases towards an ROI from a non-ROI, as illustrated in FIG. 5. Accordingly, the pixels of the image are stretched by different resizing factors.

Figure 6:
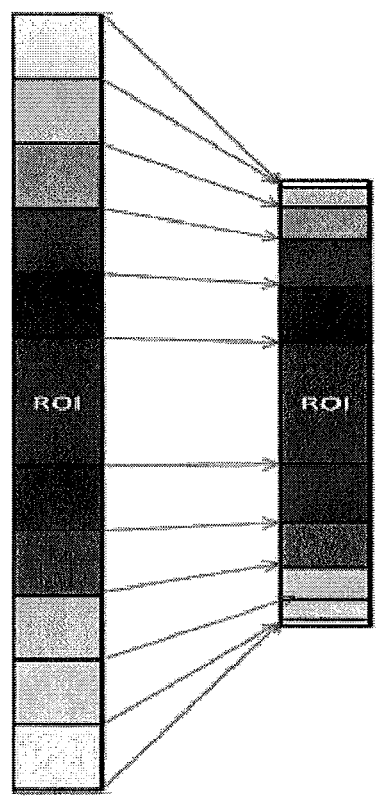
FIG. 6 illustrates an example method for vertically downsizing pixels of an image, according to embodiments of the present disclosure.

FIG. 6 illustrates an example method for vertically downsizing pixels of an image, according to embodiments of the present disclosure. As illustrated in FIG. 6, each block of the image represents one or more pixels. For example, the image having 20 pixels is considered for vertical resizing in which an ROI has 2 pixels. In order to resize the image from 20 pixels to 12 pixels, the method determines resizing factors such that a resizing factor increases towards an ROI from a non-ROI, as illustrated in FIG. 6. Accordingly, the pixels of the image are reduced by different resizing factors.

Figure 7:
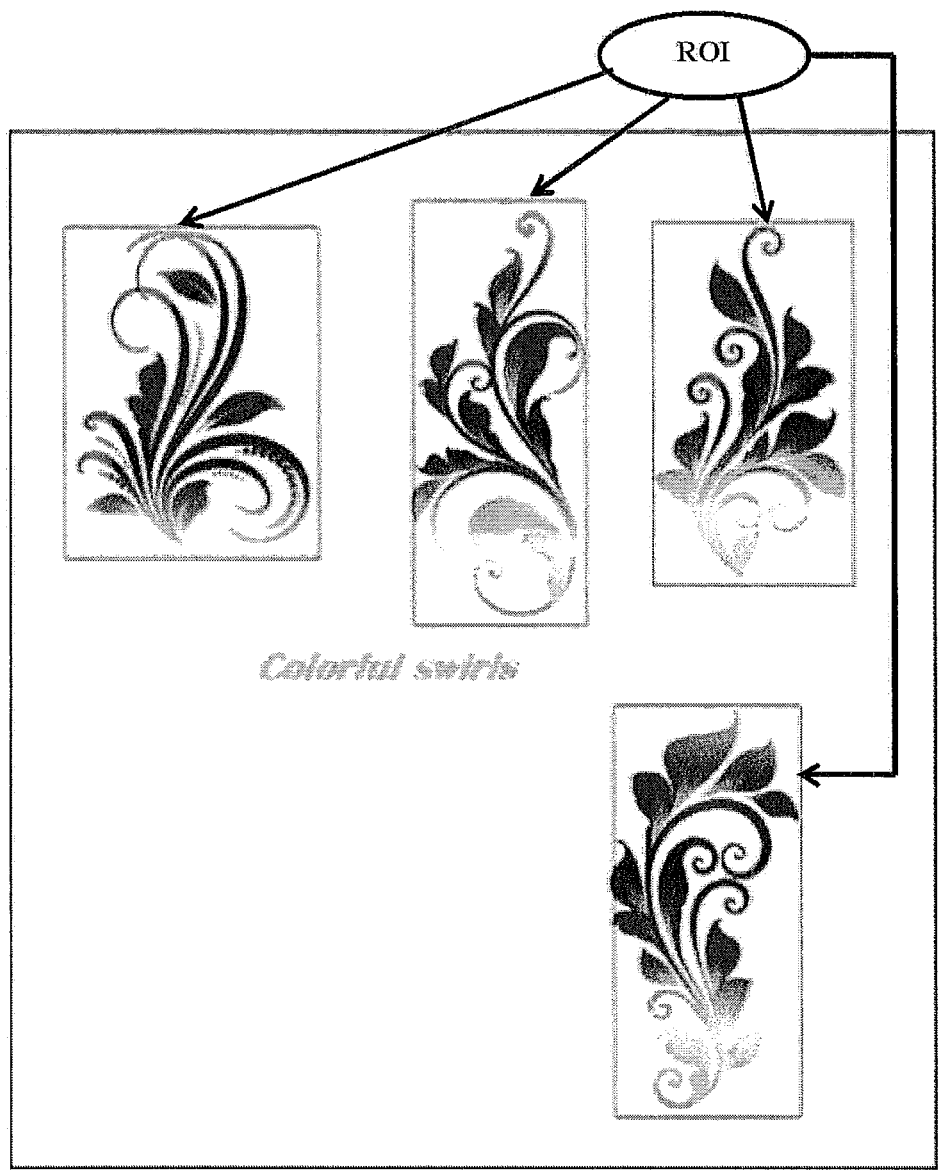
FIG. 7 illustrates an example input image for content aware image resizing, according to embodiments of the present disclosure.
Figure 8:
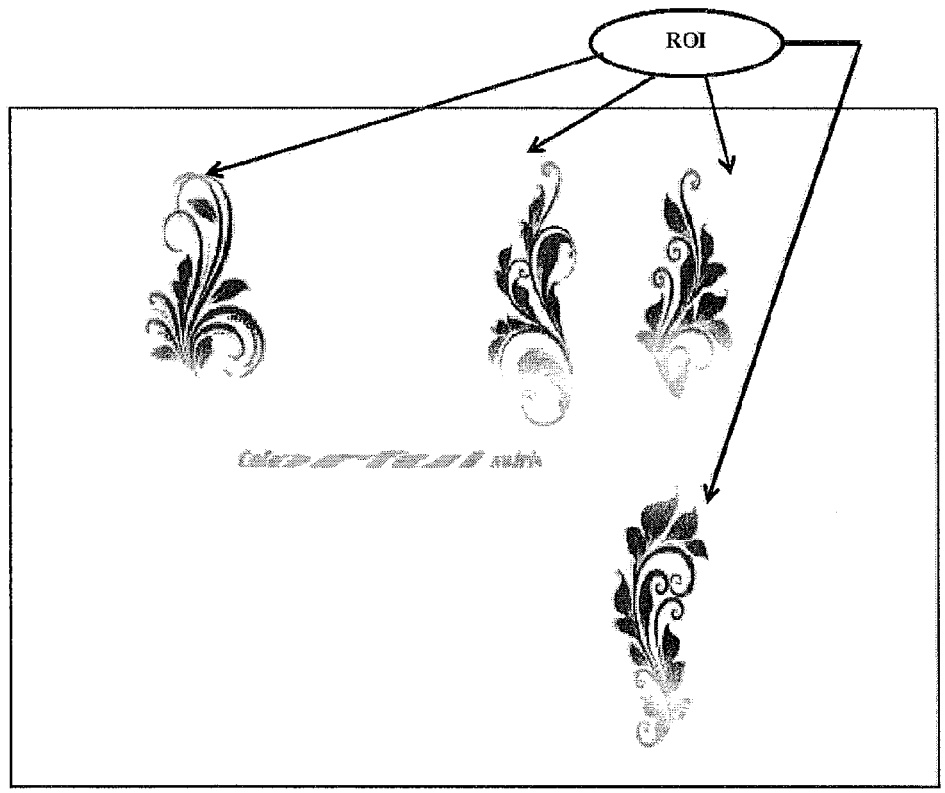
FIG. 8 illustrates an upsized image of the example source image of FIG. 7, according to embodiments of the present disclosure.
Figure 9:
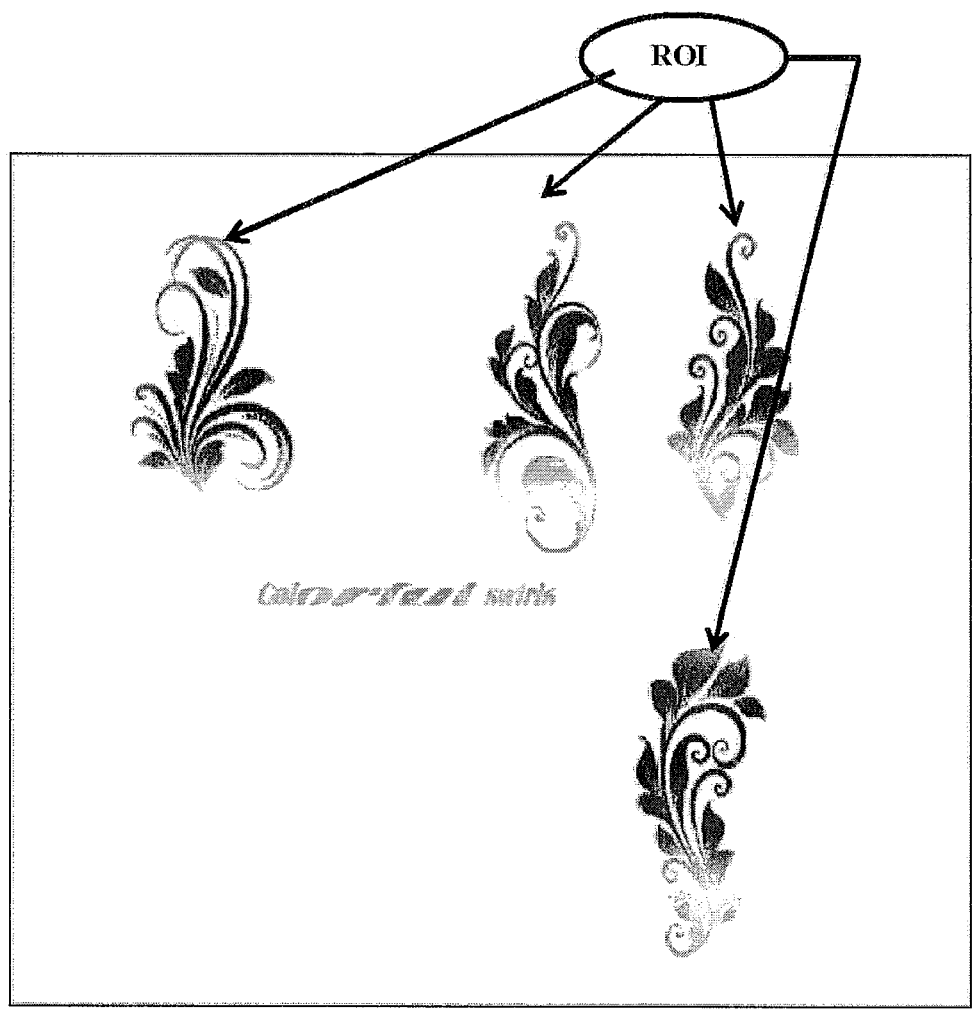
FIG. 9 illustrates a downsized image of the example source image of FIG. 7, according to embodiments of the present disclosure.

FIG. 7 illustrates example input images for content aware image resizing according to embodiments of the present disclosure. Also, FIG. 8 illustrates an upsized image of the example source image of FIG. 7 according to embodiments of the present disclosure. FIG. 9 illustrates a downsized image of the example source image of FIG. 7 according to embodiments of the present disclosure. Referring to FIG. 7, the image has four ROIs preserved during upsizing and downsizing, as illustrated in FIG. 8 and FIG. 9, respectively. In addition, in the FIG. 8 and FIG. 9, letters of the word "colorful swings" near ROIs are resized to be smaller than other letters, if any, spaced apart from the ROIs.

Figure 10:
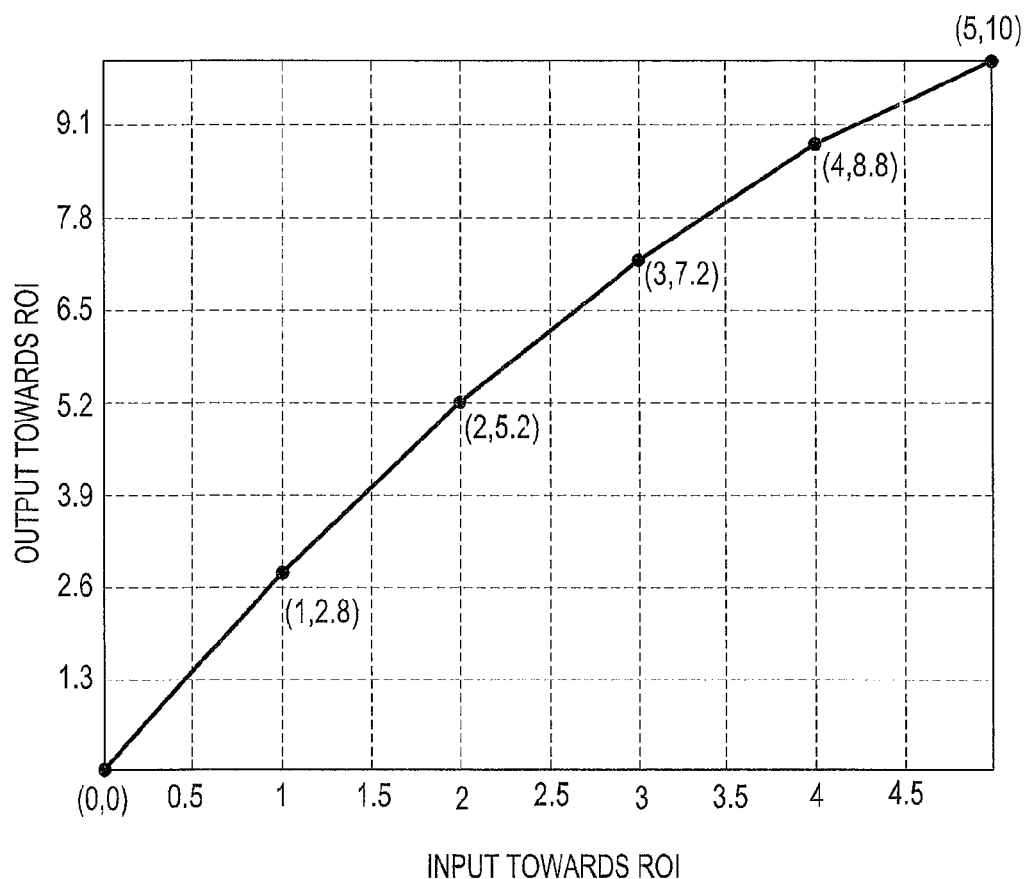
FIG. 10 illustrates an example resizing factor graph for calculating a resizing factor, when a non-region of interest exists at a left side or an upper side of a region of interest in an input image, according to embodiments of the present disclosure.

FIG. 10 illustrates an example resizing factor graph for calculating a resizing factor, when a non-ROI exists at a left side or an upper side of an ROI in the input image 101, according to embodiments of the present disclosure. As illustrated in FIG. 10, the resizing factor decreases towards the ROI. In this example, consideration is given to the image having 5 pixels, which is stretched to 10 pixels. In order to determine resizing factors, the method generates a resizing function. The method has determined slopes of the curve at two end points (0, 0) and (5, 10) as 3 and 1, respectively.

By using these values, the method generates a resizing function or a cubic polynomial function, which is expressed by Equation (8) below.

$$f(x) = -\left(\frac{1}{5}\right)x^2 + 3x \quad (8)$$

Equation (8) is used to determine resizing factors of five pixels in the input image 101, thereby stretching a pixel region from five pixels to ten pixels.

Figure 11:
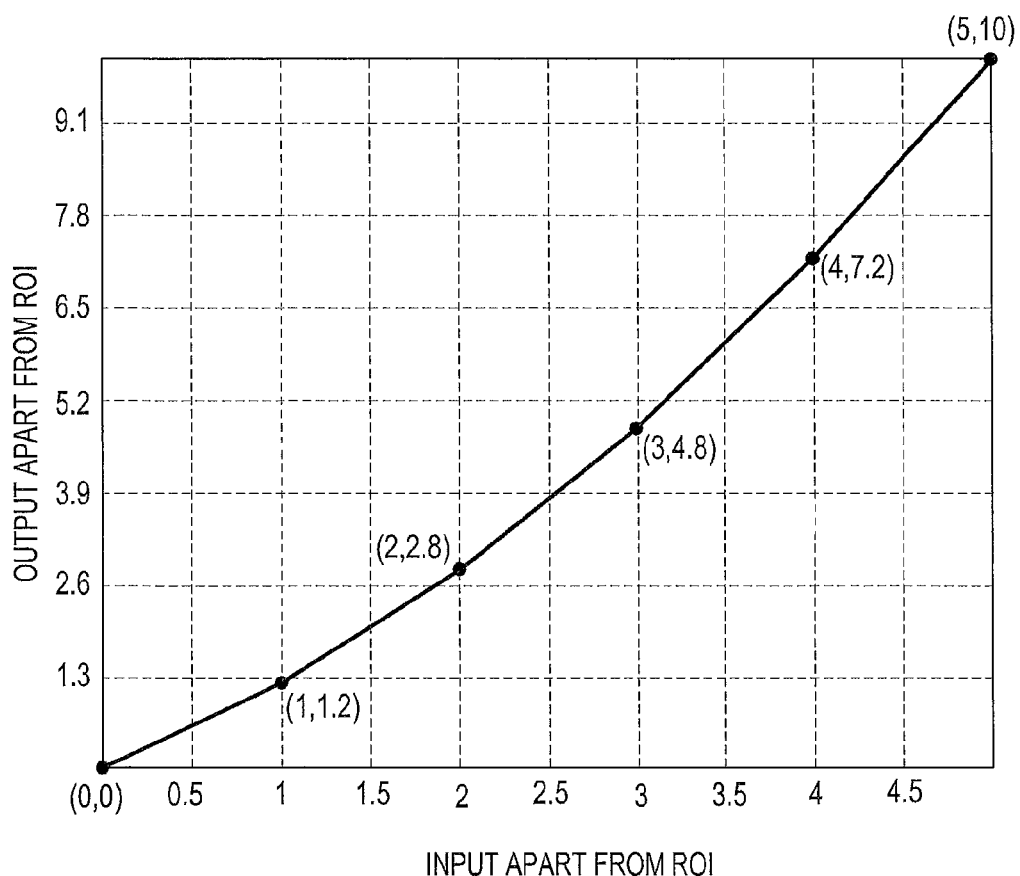
FIG. 11 illustrates an example curve or a resizing factor graph for calculating a resizing factor, when a non-region of interest exists at a right side or a lower side of an input image, according to embodiments of the present disclosure.

FIG. 11 illustrates an example curve or a resizing factor graph for calculating a resizing factor, when a non-ROI exists at a right side or a lower side of the input image 101, according to embodiments of the present disclosure. As illustrated in FIG. 11, the resizing factor increases towards an ROI region. In this example, consideration is given to the image having 5 pixels, which is resized to 10 pixels. In order to determine resizing factors, the method generates a resizing function. The method has determined slopes of the curve at two end points (0, 0) and (5, 10) as 1 and 3, respectively. By using these values, the method generates a cubic polynomial function or a resizing function, which is expressed by Equation (9) below.

$$f(x) = \left(\frac{1}{5}\right)x^2 + 3x \quad (9)$$

Equation (9) is used to determine resizing factors of five pixels in the input image 101, thereby stretching a pixel region from five pixels to ten pixels.

Figure 12:
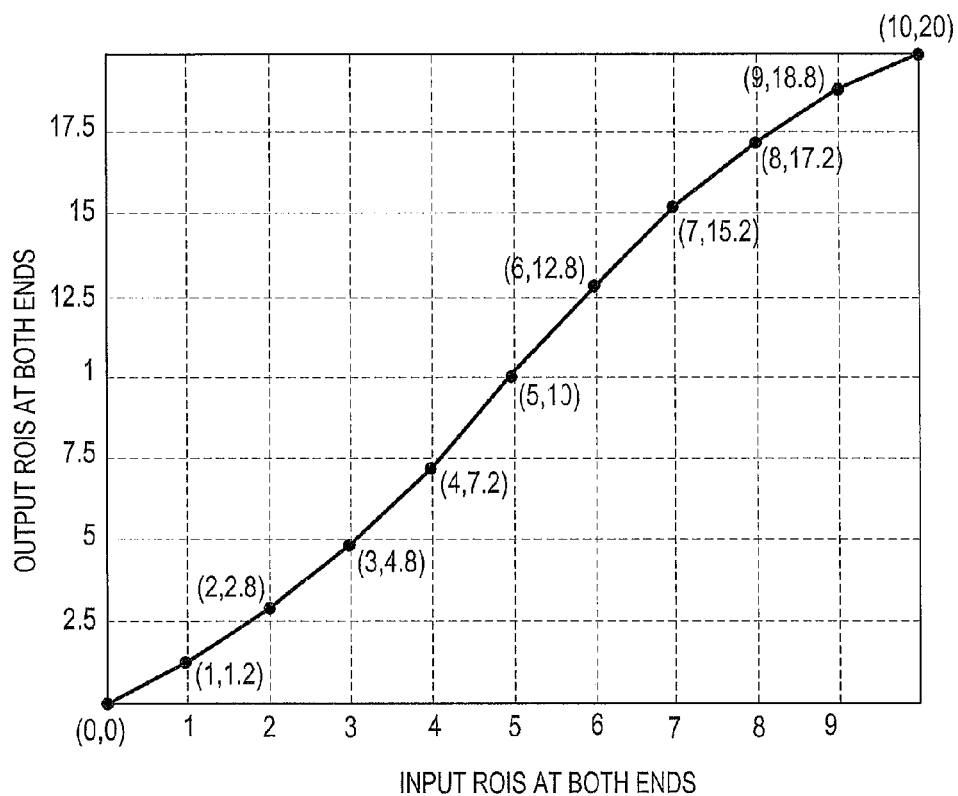
FIG. 12 illustrates an example curve or resizing factor graph for calculating a resizing factor, when a non-region of interest exists in between two regions of interest in the input image, according to embodiments of the present disclosure.

FIG. 12 illustrates an example curve or a resizing factor graph for calculating a resizing factor, when a non-ROI exists in between two ROIs in the input image 101, according to embodiments of the present disclosure. As illustrated in FIG. 12, the resizing factor increases towards a midpoint between the two ROIs and also increases towards an ROI other than the two ROIs. In this example, consideration is given to the image having 10 pixels, which is resized to 20 pixels. It is clear from the graph that the resizing factor increases nonlinearly until the fifth pixel and decreases nonlinearly from the fifth pixel to the tenth pixel. In this case, in order to determine resizing factors until the fifth pixel, use is made of a function expressed by Equation (10) below.

$$f(x) = \left(\frac{1}{5}\right)x^2 + 3x \quad (10)$$

A resizing factor from the fifth pixel to the tenth pixel is determined by using a function expressed by Equation (11) below.

$$f(x) = -\left(\frac{1}{5}\right)x^2 + 3x \quad (11)$$

The method for content aware multimedia resizing provides a number of advantages. A resizing process using the method is computationally inexpensive. In addition, the method provides the user with control over ROIs and resizing. Further, the method for content aware multimedia resizing increases the viewing experience of the user.

The embodiments of the present disclosure may be implemented by at least one software program that is executed on at least one hardware device and performs network management functions in order to control the elements. The elements illustrated in FIG. 1 may be at least one of a hardware device and a combination of a hardware device and a software module.

The foregoing description of the specific embodiments will so fully reveal the general nature of the embodiments of the present disclosure that others can, by applying current knowledge, readily modify and/or adapt for various applications such specific embodiments without departing from the generic concept. Accordingly, such adaptations and modifications are intended to be comprehended within the meaning and range of equivalents of the disclosed embodiments. It is to be understood that the phraseology or terminology employed in this specification is for the purpose of description and not of limitation. Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for content aware multimedia resizing, the method comprising:
    selecting at least one region of interest (ROI) in an input multimedia;
    resizing the at least one ROI;
    nonlinearly resizing at least one non-ROI in the input multimedia using a resizing factor;
    dividing each non-ROI in the input multimedia into multiple segments,
    wherein the resizing factor of the divided multiple segments is nonlinearly decreased towards the at least one ROI from the at least one non-ROI, when the resizing corresponds to a horizontal up resizing or a vertical up resizing, and
    wherein the resizing factor of the divided multiple segments is nonlinearly increased towards the at least one ROI from the at least one non-ROI, when the resizing corresponds to a horizontal down resizing or a vertical down resizing; and
    generating an output multimedia with the resized at least one ROI and the resized at least one non-ROI.

2. The method of claim 1, wherein resizing the at least one ROI comprises maintaining an aspect ratio of the at least one ROI in the output multimedia to be the same as an aspect ratio of the input multimedia.

3. The method of claim 1, wherein the input multimedia comprises one of an image and a video.

4. The method of claim 1, further comprising:
    before resizing of the at least one ROI,
        acquiring dimensions of the at least one ROI in the input multimedia; and
        sorting the at least one ROI with respect to the dimensions.

5. The method of claim 4, further comprising:
    determining at least one non-overlapping ROI among the at least one sorted ROI.

6. The method of claim 1, further comprising:
    before resizing of the at least one non-ROI,
        identifying the at least one non-ROI; and
        acquiring dimensions of the at least one non-ROI.

7. The method of claim 1, wherein resizing the selected at least one ROI comprises:

calculating a resized dimension of the at least one ROI based on at least one of the dimensions of the output multimedia; and resizing the at least one ROI according to the calculated resized dimension.

8. The method of claim 7, wherein nonlinearly resizing the at least one non-ROI comprises:

calculating a resized dimension of the at least one non-ROI based on at least one of the dimensions of the output multimedia and the calculated resized dimension of the at least one ROI; and dividing the at least one non-ROI into multiple segments, wherein each of the multiple segments comprises one or more pixels.

9. The method of claim 8, further comprising:

nonlinearly resizing the multiple segments by applying a resizing function, wherein the resizing function determines a resizing factor of each of the multiple segments.

10. The method of claim 9, wherein the resizing factor increases nonlinearly towards a midpoint between the at least one ROI and a successive ROI in the input multimedia, and decreases towards the successive ROI, when the at least one non-ROI exists in between the at least one ROI and the successive ROI in the input multimedia.

11. The method of claim 9, further comprising:

generating the resizing function.

12. The method of claim 1, wherein resizing the at least one ROI comprises at least one of increasing or decreasing at least one ROI in a horizontal dimension, and increasing or decreasing at least one ROI in a vertical dimension.

13. The method of claim 1, further comprising generating the output multimedia by arranging the at least one resized ROI and the at least one resized non-ROI in order of occurrence of coordinates of the at least one resized ROI and the at least one resized non-ROI in the input multimedia.

14. A non-transitory computer-readable medium storing a program for content aware multimedia resizing, the program which when executed by a processor causes the processor to perform operations comprising:

selecting at least one region of interest (ROI) in an input multimedia;

resizing the at least one ROI;

nonlinearly resizing at least one non-ROI in the input multimedia using a resizing factor;

dividing each non-ROI in the input multimedia into multiple segments, wherein the resizing factor of the divided multiple segments is nonlinearly decreased towards the at least one ROI from the at least one non-ROI, when the resizing corresponds to a horizontal up resizing or a vertical up resizing, and wherein the resizing factor of the divided multiple segments is nonlinearly increased towards the at least one ROI from the at least one non-ROI, when the resizing corresponds to a horizontal down resizing or a vertical down resizing; and generating an output multimedia with the resized at least one ROI and the resized at least one non-ROI.

15. The non-transitory computer-readable medium of claim 14, wherein resizing the at least one ROI comprises maintaining an aspect ratio of the selected at least one ROI in output multimedia to be the same as an aspect ratio of the input multimedia.

16. The non-transitory computer-readable medium of claim 14, the operations further comprising:

before resizing the selected at least one ROI, acquiring dimensions of the at least one ROI in the input multimedia; and sorting the at least one ROI with respect to the dimensions.

17. The non-transitory computer-readable medium of claim 16, the operations further comprising:

determining at least one non-overlapping ROI among the at least one sorted ROI.

18. The non-transitory computer-readable medium of claim 14, the operations further comprising: before resizing the at least one non-ROI, identifying the at least one non-ROI, and acquiring dimensions of the at least one non-ROI.

19. The non-transitory computer-readable medium of claim 14, the operations further comprising:

calculating an output dimension of the at least one ROI based on at least one of the dimensions of the output multimedia and at least one of the dimensions of the input multimedia; and resizing the at least one ROI based on the calculated output dimension.

20. The non-transitory computer-readable medium of claim 14, the operations further comprising:

calculating an output dimension of the at least one non-ROI based on at least one of the predetermined dimensions of the output multimedia and the calculated output dimension of the at least one ROI;

dividing the at least one non-ROI into multiple segments; and nonlinearly resizing the multiple segments by applying a resizing function, wherein each of the multiple segments comprises one or more pixels, wherein the resizing function determines a resizing factor of each of the multiple segments, and wherein the resizing function is generated by a content aware image resizing (CAIR) module.

21. The non-transitory computer-readable medium of claim 20, wherein the resizing factor increases nonlinearly towards a midpoint between the at least one ROI and a successive ROI in the input multimedia, and decreases towards the successive ROI, when the at least one non-ROI exists in between the at least one ROI and the successive ROI in the input multimedia.

22. The non-transitory computer-readable medium storing the program of claim 14, the operations further comprising:

Generating, by the CAIR module, the output multimedia by arranging the at least one resized ROI and the at least one resized non-ROI in order of occurrence of coordinates of the at least one resized ROI and the at least one resized non-ROI in the input multimedia.

23. An electronic device for content aware multimedia resizing, the electronic device comprising a processor configured to:

select at least one region of interest (ROI) in an input multimedia;

resize the at least one ROI;

nonlinearly resize at least one non-ROI in the input multimedia using a resizing factor;

divide each non-ROI in the input multimedia into multiple segments, wherein the resizing factor of the divided multiple segments is nonlinearly decreased towards the at least one ROI from the at least one non-ROI, when the resizing corresponds to a horizontal up resizing or a vertical up resizing, and wherein the resizing factor of the divided multiple segments is nonlinearly increased towards the at least one ROI from the at least one non-ROI, when the resizing corresponds to a horizontal down resizing or a vertical down resizing; and generate an output multimedia with the resized at least one ROI and the resized at least one non-ROI.

24. The electronic device of claim 23, wherein the processor is further configured to maintain an aspect ratio of the at least one ROI in the output multimedia to be the same as an aspect ratio of the input multimedia.

25. The electronic device of claim 23, wherein the input multimedia comprises one of an image and a video.

\* \* \* \* \*